United States Patent
Binns et al.

(10) Patent No.: US 10,244,016 B1
(45) Date of Patent: Mar. 26, 2019

(54) LOCAL CACHE FOR MEDIA CONTENT PLAYBACK

(71) Applicant: Amazon Technologies, Inc., Seattle, WA (US)

(72) Inventors: Justin Michael Binns, Auburn, WA (US); Girish Bansilal Bajaj, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 606 days.

(21) Appl. No.: 14/858,383

(22) Filed: Sep. 18, 2015

(51) Int. Cl.
G06F 15/16 (2006.01)
H04L 29/06 (2006.01)
H04L 29/08 (2006.01)

(52) U.S. Cl.
CPC ...... *H04L 65/4069* (2013.01); *H04L 67/2842* (2013.01)

(58) Field of Classification Search
CPC ......... H04N 21/8456; H04N 21/26258; H04N 21/23106; H04N 21/23439; H04N 21/2187; H04N 21/2402; H04N 21/84; H04N 21/41407; H04N 21/4147; H04L 67/2842; H04L 65/4084; H04L 67/02; H04L 65/602; H04L 65/80
See application file for complete search history.

(56) References Cited

U.S. PATENT DOCUMENTS

| | | | | |
|---|---|---|---|---|
| 2003/0097531 A1* | 5/2003 | Arimilli | ............. | G06F 12/0831 711/146 |
| 2008/0155623 A1* | 6/2008 | Ota | ........................ | H04N 7/173 725/109 |
| 2011/0126248 A1* | 5/2011 | Fisher | ................ | H04N 7/17318 725/95 |
| 2012/0114302 A1* | 5/2012 | Randall | ................ | G11B 27/105 386/241 |
| 2013/0191511 A1* | 7/2013 | Liu | ..................... | H04L 67/2847 709/219 |
| 2013/0290465 A1* | 10/2013 | Harrison | ........... | G06F 17/30902 709/213 |
| 2014/0108941 A1* | 4/2014 | Joel | ................... | G06F 17/30905 715/738 |
| 2017/0041422 A1* | 2/2017 | Westphal | ............ | H04L 67/2847 |

* cited by examiner

*Primary Examiner* — Brian J. Gillis
*Assistant Examiner* — Thao D Duong
(74) *Attorney, Agent, or Firm* — Weaver Austin Villeneuve & Sampson LLP

(57) ABSTRACT

Techniques are described for providing a local cache for media content playback. A proxy device on a local network can store fragments of media content received from a media server in a local cache. Viewer devices on the local network can request the fragments from the local cache when a bandwidth of a communication connection between the viewer devices and the media server degrades.

16 Claims, 6 Drawing Sheets

505a

Quality: 1080p

Fragment B: Time range = 5 minutes 20 seconds to 5 minutes 50 seconds,
Location = CDN\Media\Movies\AO9382_2983.ismv

...

Fragment C: Time range = 5 minutes 51 seconds to 6 minutes 21 seconds,
Location = CDN\Media\Movies\AO9382_2984.ismv

...

Fragment I: Time range = 24 minutes, 30 seconds to 25 minutes 0 seconds
Location = CDN\Media\Movies\AO9382_2988.ismv Quality: 576i

Fragment B: Time range = 5 minutes 20 seconds to 5 minutes 50 seconds,
Location = CDN\Media\Movies\AO9382_2983.ismv

...

Fragment C: Time range = 5 minutes 51 seconds to 6 minutes 21 seconds,
Location = CDN\Media\Movies\AO9382_2984.ismv

...

Fragment I: Time range = 24 minutes, 30 seconds to 25 minutes 0 seconds
Location = CDN\Media\Movies\AO9382_2988.ismv

505b

Quality: 1080p

Fragment B: Time range = 5 minutes 20 seconds to 5 minutes 50 seconds,
Location = CDN\Media\Movies\AO9382_2983.ismv

...

Fragment C: Time range = 5 minutes 51 seconds to 6 minutes 21 seconds,
Location = CDN\Media\Movies\AO9382_2984.ismv

...

Fragment I: Time range = 24 minutes, 30 seconds to 25 minutes 0 seconds
Location = CDN\Media\Movies\AO9382_2988.ismv Quality: 576i

Fragment B: Time range = 5 minutes 20 seconds to 5 minutes 50 seconds,
Location = LocalCache\Media\Movies\AO9382_2983.ismv

...

Fragment C: Time range = 5 minutes 51 seconds to 6 minutes 21 seconds,
Location = LocalCache\Media\Movies\AO9382_2984.ismv

...

Fragment I: Time range = 24 minutes, 30 seconds to 25 minutes 0 seconds
Location = LocalCache\Media\Movies\AO9382_2988.ismv

*FIGURE 5*

LOCAL CACHE FOR MEDIA CONTENT PLAYBACK

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming determines the viewer device's bandwidth in real time and adjusts the quality of the media content that is requested and played back on the viewer's device to account for changes in the bandwidth. Fragments of the media content are requested individually and stored in a buffer for playback. Unfortunately, if the bandwidth significantly degrades, the streaming of the media content using the fragments can begin to drain the buffer faster than it can be filled, resulting in the playback being interrupted for rebuffering.

BRIEF DESCRIPTION OF THE DRAWINGS

FIG. 5 illustrates an example of modifying a manifest to provide a local cache for media content playback.

DETAILED DESCRIPTION

This disclosure describes techniques for implementing a local cache for media content playback that can reduce or eliminate rebuffering that is often experienced when streaming media content. For example, when a viewer requests media content (e.g., a movie, a television show, a video, a music track or album, an electronic book, etc.) to stream for playback on a device, the bandwidth of the Internet connection available to the viewer's device can be used to determine a quality level of the media content to be requested from a media server. Fragments of the media content based on the quality level are requested, provided by the media server, and stored in a buffer of the viewer's device used during playback. A local cache on the viewer's local network can also request fragments of the same media content at a lower quality level. When the bandwidth degrades, the low quality level fragments of the media content on the local cache can be used by the viewer's device to fill the buffer rather than the media server. As a result, the playback of the media content does not need to be interrupted for rebuffering.

Figure 1:
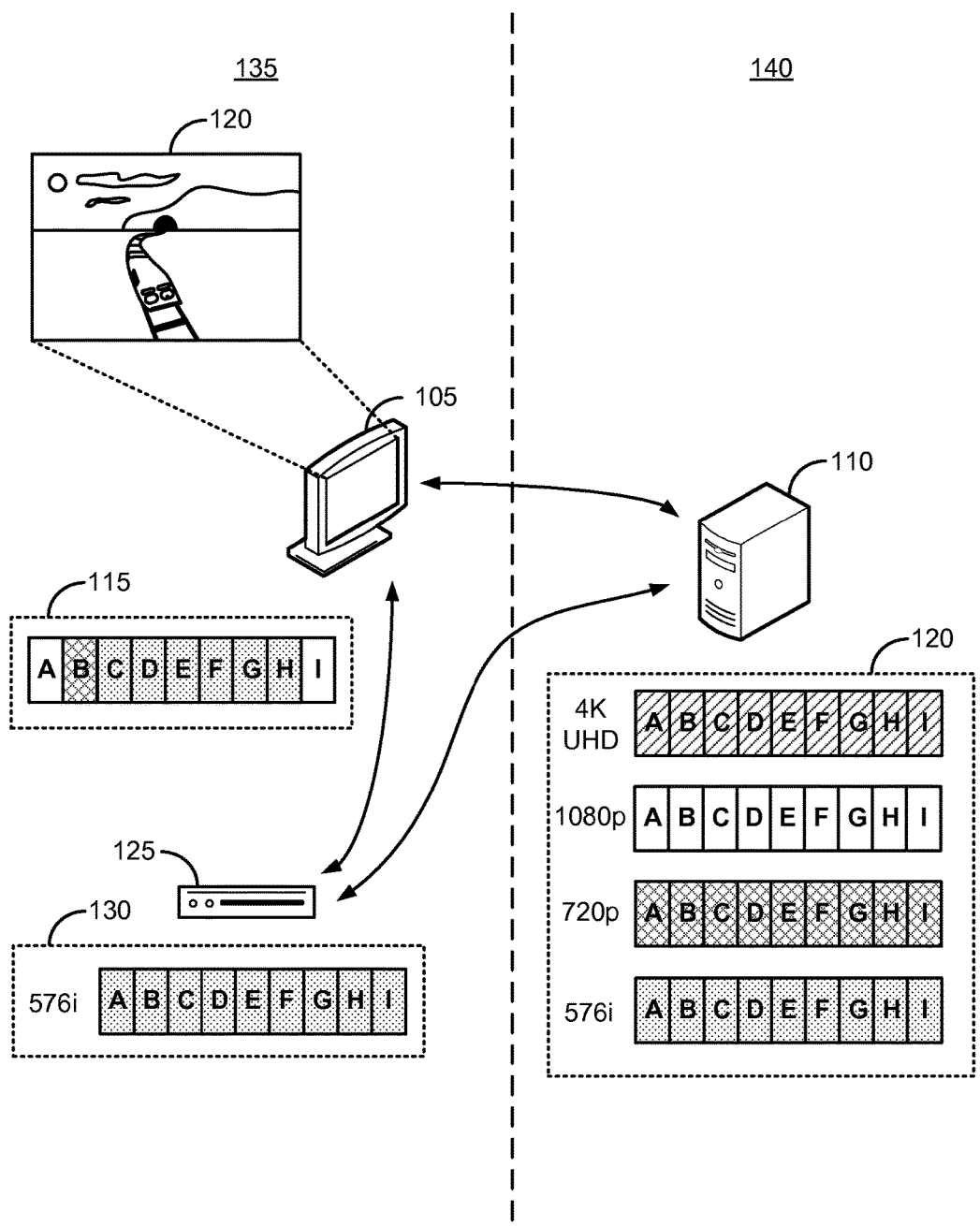
FIG. 1 illustrates an example of a local cache for media content playback.

FIG. 1 illustrates an example of a local cache for media content playback. As shown in FIG. 1, viewer device 105 of local network 135 can request and receive fragments of media content from both media server 110 of content delivery network (CDN) 140 and proxy device 125 of local network 135. In the depicted implementation, media server 210 (in conjunction with proxy device 125) can provide multiple versions of media content at different quality levels to viewer device 105, for example, over the Internet by receiving requests for specific fragments based on the bandwidth of the Internet connection available to viewer device 105. For example, as the bandwidth increases, higher-bit rate versions of the media content providing higher-quality video or audio can be requested by viewer device 105 from media server 110. Proxy server 125 can also request lower-bit rate media content from media server 110 to provide a local cache for viewer device 105 and providing media content at a lower quality level as a "floor" or minimum quality level that can be streamed from when the Internet bandwidth decreases to a level such that playback of media content streamed from media server 110 would otherwise be interrupted.

In more detail, viewer device 105 and proxy device 125 can communicate with each other on local network 135 (e.g., a local area network (LAN) such as a Wi-Fi network set up in a home, office, etc.). Viewer device 105 and proxy device 125 can communicate via a communication connection with media server 110 of CDN 140, such as a wide area network (WAN) such as the Internet. Generally, the bandwidth (i.e., the available bit-rate, or bits per second) for communication between viewer device 105 and proxy device 125 within local network 135 is significantly faster (i.e., higher bit-rate) than communication between devices within local network 135 and devices within CDN 140 due to factors such as increased latency from geographic distances and routing of data among a large number of devices between local network 135 and CDN 140. Moreover, local network 135 can be a relatively reliable network as it can be implemented within a smaller area and with fewer components, such as within viewer's home. As a result, even if the Internet connection that the devices of local network 135 use goes down or the bandwidth significantly degrades, communications between viewer device 105 and proxy device 125 can still be up and fast and therefore capable of providing a local cache that can be used by viewer device 105 for playback of media content.

For example, a user might want to watch episode #1, titled "Express to Terror," of the 1979 television drama series Supertrain, indicated as media content 120 in FIG. 1. Media server 110 can provide many versions of media content 120 at different quality levels. In FIG. 1, media content 120 can be provided in a hierarchy of quality levels descending from higher-quality to lower-quality (i.e., higher bit-rate to lower bit-rate) from 4K ultra-high definition (UHD) resolution, 1080p, 720p, and standard definition (SD) 576i. Additionally, media content 120 can be provided in fragments (i.e., smaller portions or segments of media content 120 as a whole) based on the quality levels. For example, fragment A for the quality levels might include video data for playback of media content 120 from the beginning (i.e., 0 seconds) to 30 seconds. Fragment B for the quality levels might include video data for playback of media content 120 from 31 seconds to 60 seconds. Other parts of the media content, such as audio, can also be provided in a similar manner.

Fragments from different quality levels can be requested by viewer device 105 to complete playback of media content 120. For example, viewer device 105 might determine that the Internet connection used by it to contact media server 110 is relatively fast, and therefore, might request fragment A to be from a higher quality level, such as 1080p. As a result, buffer 115 of viewer device 115 is used to store fragment A for playback. Buffer 115 can store a relatively small amount of data for playback of media content 120

(e.g., seconds to minutes). As fragments are played back, they can be removed from buffer 115 and new fragments can be requested and stored for playback.

However, if the Internet connection degrades, for example, by having its bandwidth reduce, lower quality fragments than the 1080p quality level of fragment A in buffer 115 can be requested. For example, in FIG. 1, fragment B in buffer 115 is at a 720p quality level. Viewer device 105 can request the lower quality 720p fragment to avoid emptying (or reducing the number of fragments) buffer 115 such that play back of media content 120 is interrupted (i.e., buffer 115 being drained of fragments for playback of the media content faster than being filled with fragments). As one example, if buffer 115 empties, then viewer device 105 might need to "rebuffer" buffer 115 by re-filling it with data while halting playback of media content 120, which results in the viewer's experience being interrupted.

In FIG. 1, when viewer device 105 requests playback of media content 120, proxy device 125 can also request fragments of media content 120 to provide a local cache. For example, in FIG. 1, local cache 130 of proxy device 125 stores fragments A-I of media content 120 at the SD 576i quality level. With these fragments, local cache 130 can provide a minimum quality-level "floor" that can be streamed to device 105 when the Internet bandwidth decreases to a threshold bandwidth such that viewer device 105 would not be able to fill buffer 115 fast enough as media content 120 is played back without rebuffering. For example, in FIG. 1, fragments C-H can be requested from local cache 130 rather than media server 110 when the Internet connection between viewer device 105 and media server 110 degrades since viewer device 105 and proxy device 125 communicate on local network 135 rather than using the Internet.

When the bandwidth of the Internet connection is restored or improves, viewer device 105 can determine that it can provide playback at a higher quality level, and therefore, request fragments of media content 120 from media server 110 at a higher quality level. For example, in FIG. 1, fragment I is at the 1080p quality level and is requested when the Internet connection is restored. As a result, local cache 130 can provide a backup for playback of media content 120 that can be used by viewer device 105 when rebuffering of buffer 115 would otherwise occur if the fragments had to be requested from media server 110.

In some implementations, proxy device 125 can store all of the fragments of media content 120 at the SD 576i quality level in local cache 130 such that an entire playback of media content 120 can be streamed at the SD 576i quality level. Additionally, proxy device 125 can store other media content in local cache 130 based on the selection of media content 120 for playback. For example, proxy server 125 can also store SD 576i quality level fragments for episodes two through nine of Supertrain in anticipation of the viewer requesting those after finishing the playback of media content 120. As a result, local cache 130 can provide a backup library of likely-to-watch media content for viewer device 105 in the event of degradation of the Internet connection.

It should be noted that though only one viewer device 105 is shown on local network 135, in some implementations, multiple viewer devices can be on local network 135 and using proxy device 125 for local cache 130.

Figure 2:
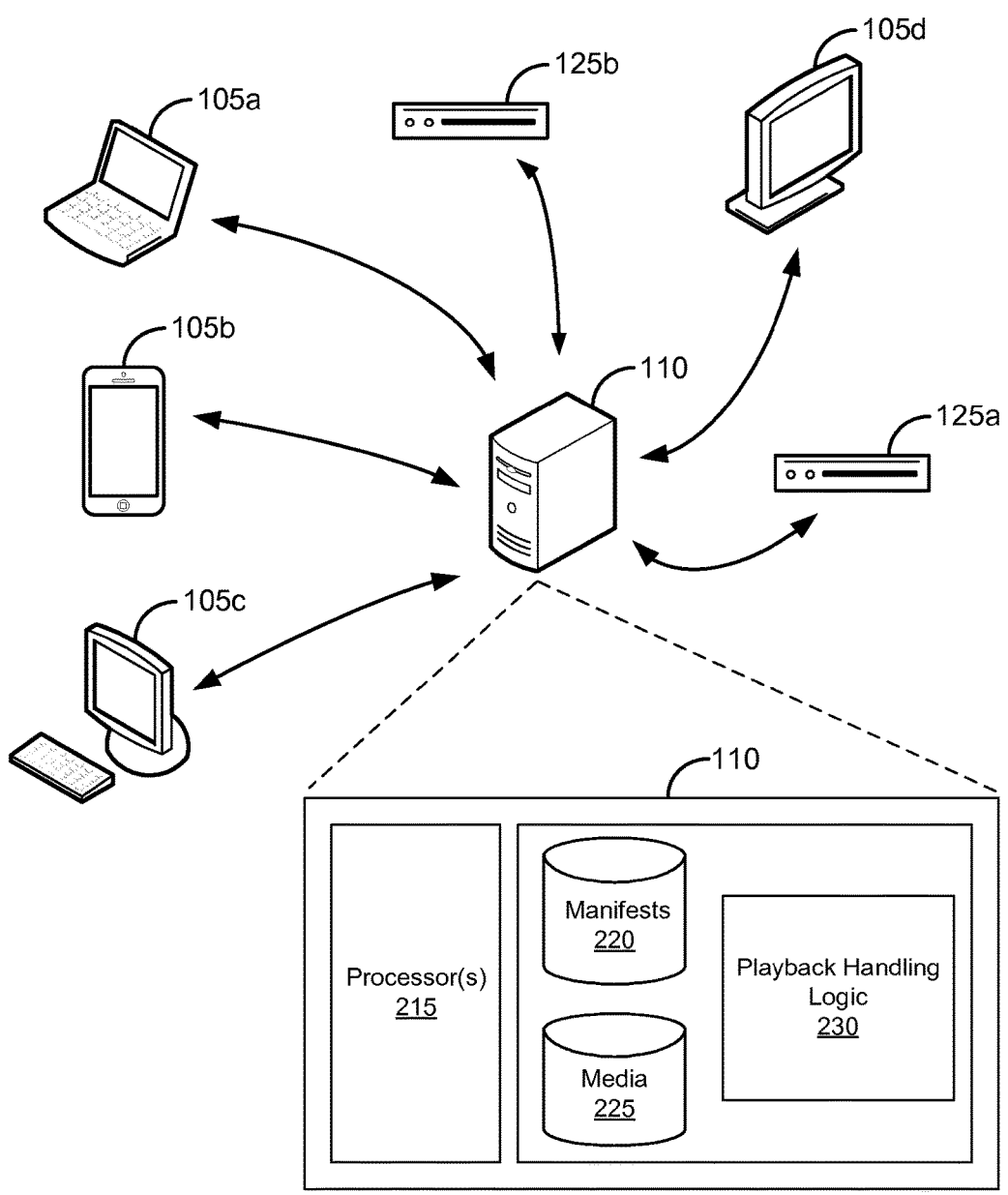
FIG. 2 illustrates an example of a computing environment for providing a local cache for media content playback.

FIG. 2 illustrates an example of a computing environment for providing a local cache for media content playback. The computing environment of FIG. 2 includes media server 110 which can be used to provide media content for playback on viewer devices 105a-d. Viewer device 105a is a laptop computer, viewer device 105b is a smartphone, viewer device 105c is a desktop computer, and viewer device 105d is a television. Other types of devices such as set-top boxes, tablets, wearable devices (e.g., smart watches), etc. may also be included in the computing environment. Proxy devices 125a and 125b also can retrieve media content from media server 110 for playback on devices 105a-d. Proxy devices 125a and 125b in FIG. 2 are set-top boxes. Some devices may include functionality of both viewer devices and proxy devices. For example, a set-top box or a television may include capability to stream media content from fragments requested from media server 110 as well as include local cache functionality as a proxy device. In some implementations, the local cache can also be aggregated among multiple proxy devices or viewer devices.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 may be part of a content delivery system that conforms to any of a wide variety of architectures. The functionality and components of media server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on devices 105a-d or proxy devices 125a, 125b), integrated into a separate app from another entity, implemented in an edge server or content server of a CDN, a server of an ISP, etc.

Media server 110 can include various types of logic used to provide media content for playback at devices 105a-d. In FIG. 2, media server 110 includes media content storage 225, manifest data storage 220, and playback handling logic 230. Media server 110 also can include one or more processors 215, memory, and other hardware for performing the tasks disclosed herein.

Media content storage 225 stores a variety of media content for playback on devices 105a-d, such as episodes of shows, movies, music, digital or electronic books, videos (e.g., content uploaded by users of video streaming sites), etc. Additionally, media content storage 225 can store metadata associated with media content, such as the start and end times of scenes (i.e., segments of the media content), ratings/reviews, etc. of shows and movies, etc.

Manifest data storage 220 can provide data to viewer devices 105*a-d* indicating how to stream media content from media server 110. For example, when a user selects a particular video to play on a viewer device, the viewer device can request a manifest file from media server 110. The manifest file includes metadata that allows the device to generate properly formatted requests for specific fragments of media content. The manifest can include all of the fragments that together make the full media content (e.g., episode #1 of Supertrain as media content 120 in FIG. 1). Different combinations of conditions (e.g., video quality, audio quality) can indicate different segmentation of the media content into individual fragments. As a result, the manifest file can be a type of catalog of fragments associated with bitrates offering different quality levels.

Playback handling logic 230 may provide media content from media content storage 225 and manifest files from manifest data storage 220. For example, playback handling logic 230 may receive data from viewer device 105*a* requesting playback of particular media content. As a result, playback handling logic 230 may find a manifest file in manifest data storage 220 corresponding to the media content that viewer device 105*a* is requesting and provide the manifest file to viewer device 105*a*. Viewer device 105*a* can analyze the manifest file and send data to media server 110 indicating a fragment of the media content. Media server 110 may retrieve or generate the fragment and then provide it to viewer device 105*a*. Requests for fragments can be based on protocols such as HTTP Live Streaming (HLS), Microsoft Smooth Streaming, Dynamic Adaptive Streaming over HTTP (MPEG-DASH), etc.

Figure 3A:
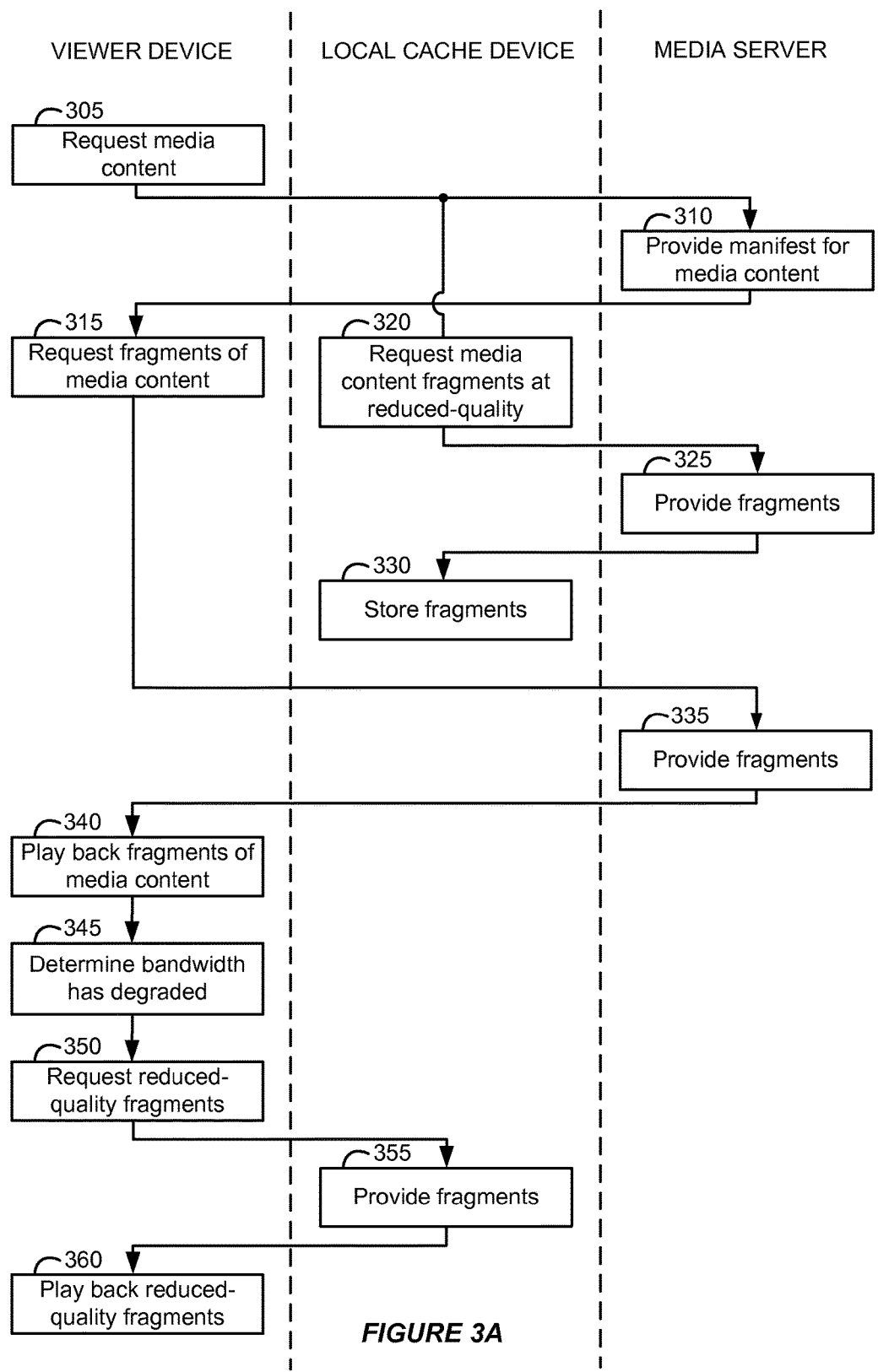
FIGS. 3A and 3B are a flowchart illustrating using a local cache for media content playback.
Figure 3B:
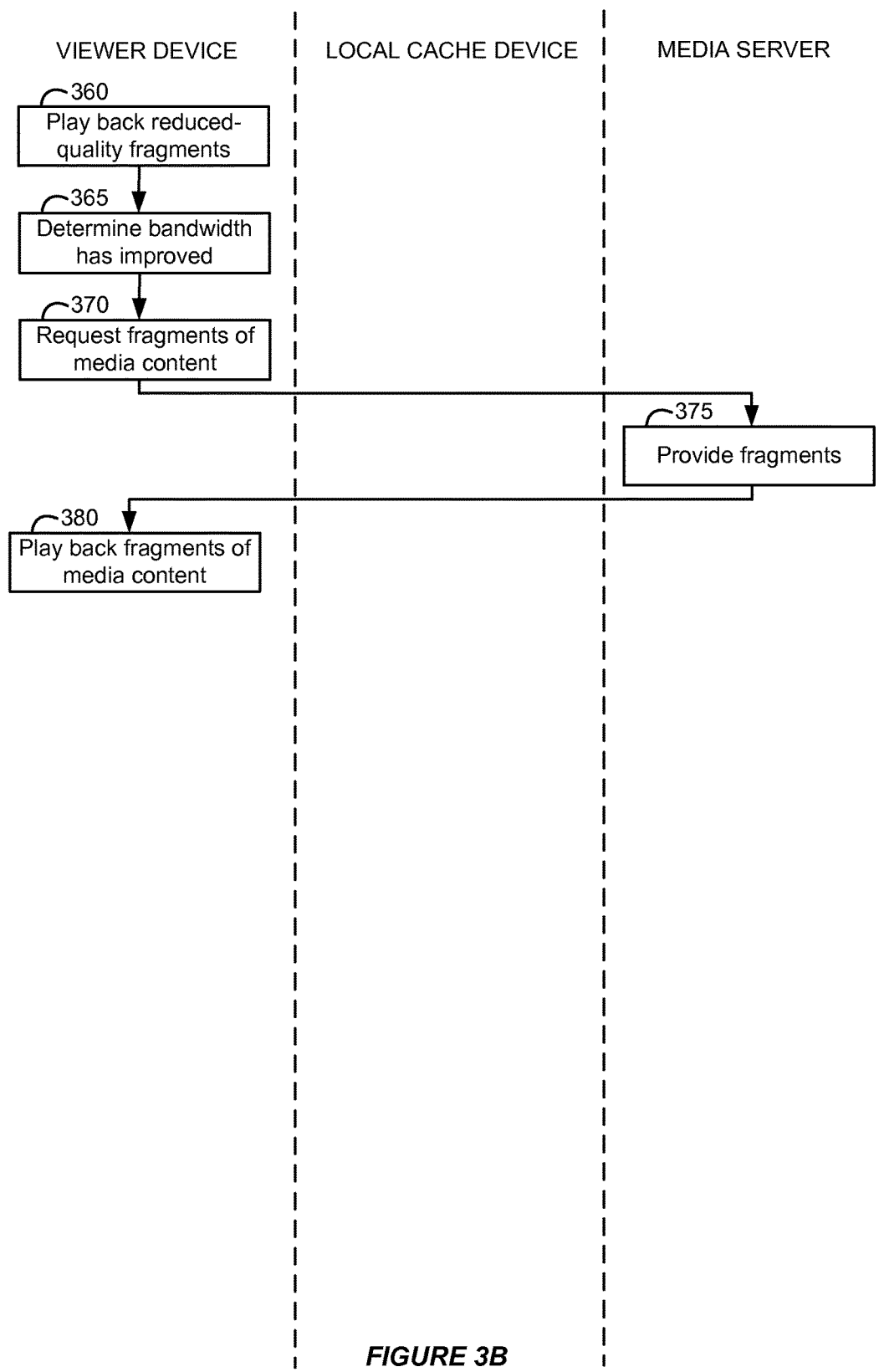

A specific implementation will now be described with reference to FIG. 1, the computing environment of FIG. 2, and the flow diagram of FIGS. 3A and 3B. In FIG. 3A, a viewer device (e.g., one of devices 105*a-d*) can request media content, for example, by selecting an episode of a television show for playback from a video streaming service in a web browser or software program, and therefore, request the particular episode from media server 110 (305). The request can be received by media server 110 and it can provide a manifest file associated with the media content (310). For example, media server 110 can provide a manifest file for the selected episode of the television show that includes metadata for fragments at different quality levels or bit rates to enable a viewer device to play back the episode as a stream of fragments.

A device including a local cache (e.g., proxy device 125) can also receive the request for media content and request fragments of the media content at a low or reduced quality to put in the local cache (320). For example, proxy device 125 can request fragments of the episode at 576i. As a result, media server 110 can provide the fragments (325) and proxy device 125 can store the fragments in the local cache (330). In some implementations, proxy device 125 can also receive the manifest file and make the request for fragments at the low quality level based on it. In some implementations, proxy device 125 may determine the characteristics, or capabilities, of viewer device 105*a* and then request fragments at a quality level based on those characteristics. For example, if viewer device 105 is determined to be a 72-inch television supporting 4K UHD resolution video playback, then the local cache might be used to store media content at the 720p quality level because SD quality content (such as 576i) might display poorly on a larger screen. By contrast, if viewer device 105 is a smartphone with a 4-inch screen, then the local cache might be used to store media content at the SD 576i quality level since a 4-inch screen would not benefit from a higher quality level as a backup. In some implementations, all or most of media content 120 at the low quality level can be requested and stored in the local cache.

In parallel or separately, the viewer device can request fragments of the media content (315) based on the received manifest file. For example, as previously discussed, the bandwidth of the Internet connection used by viewer device 105 to request and receive data from media server 110 can be analyzed and fragments of a bit-rate or quality level that is supported by the bandwidth (and capabilities of the device) can be requested by viewer device 105. As a result, media server 110 can receive the request for the fragments and provide the requested fragments to viewer device 105 (335). The viewer device can then store the requested fragments in buffer 115 for playback (340).

Changes in the bandwidth of the Internet connection can be detected (345) and lower quality or higher quality media content fragments can be requested as the bandwidth degrades or improves, respectively. If the bandwidth degrades such that buffer 115 would need to rebuffer (i.e., if fragments would be played and removed from buffer 115 faster than they can be requested from media server 110 and stored in buffer 115 at a quality level above that of the fragments in local cache 130), then viewer device 105 can request the fragments from local cache 130 of proxy device 125 (350). As a result, proxy device can receive the request and provide the requested fragments to viewer device 105 (355). Viewer device 105 can then store the requested fragments in buffer 115 and play back the reduced-quality fragments to prevent rebuffering, resulting in uninterrupted playback of media content 120 (360).

Viewer device 105 can include capabilities to analyze the bandwidth of the Internet connection and decide when to switch streaming from proxy device 125 on local network 135 and back to media server 110 of CDN 140. For example, as shown in FIG. 3B, if the bandwidth increases such that viewer device 105 can now request and play back fragments from media server 110 without rebuffering (365), then it can switch requests for the next fragments to be put in buffer 115 to be provided to media server 110 (370). Media server 110 can receive the request and then provide the fragments at a quality level higher than that stored in local cache 130 (375). As a result, viewer device 105 can resume playback using the fragments of the media content at a higher quality level than that provided by local cache 130 (380).

In some implementations, even if the bandwidth increases such that viewer device 105 can now request and play back fragments from media server 110 without rebuffering, fragments may still be provided from proxy device 105 until local cache 130 stores enough of the low quality level fragments of the media content on the local cache such that the playback of the media content does not need to be interrupted for rebuffering. That is, a threshold number of fragments may be determined to be stored within local cache 130 of proxy device 105 and then viewer device 105 can resume playing back fragments requested from media server 110. For example, when the bandwidth improves, viewer device 105 may still play back low quality level fragments from proxy device 105 while proxy device 105 is also storing additional low quality level fragments (corresponding to later portions of the playback of the media content). After five minutes, enough fragments may be stored within local cache 130 of proxy device 105, and therefore, viewer device 105 can then begin streaming higher quality level fragments from media server 110.

In some implementations, the functionality of viewer device 105 and proxy device 125 providing local cache 130 can be provided by the same device. For example, a set-top box, computer, digital media player, video game console, or other type of device can be used for streaming media content as well as include storage capabilities to provide local cache 130. In some implementations, local cache 130 can be implemented by a hard disk drive, solid-state drives, or plug-in memory such as secure digital (SD) cards, Multi-MediaCards (MMC), flash USB drives, etc.

Figure 4:
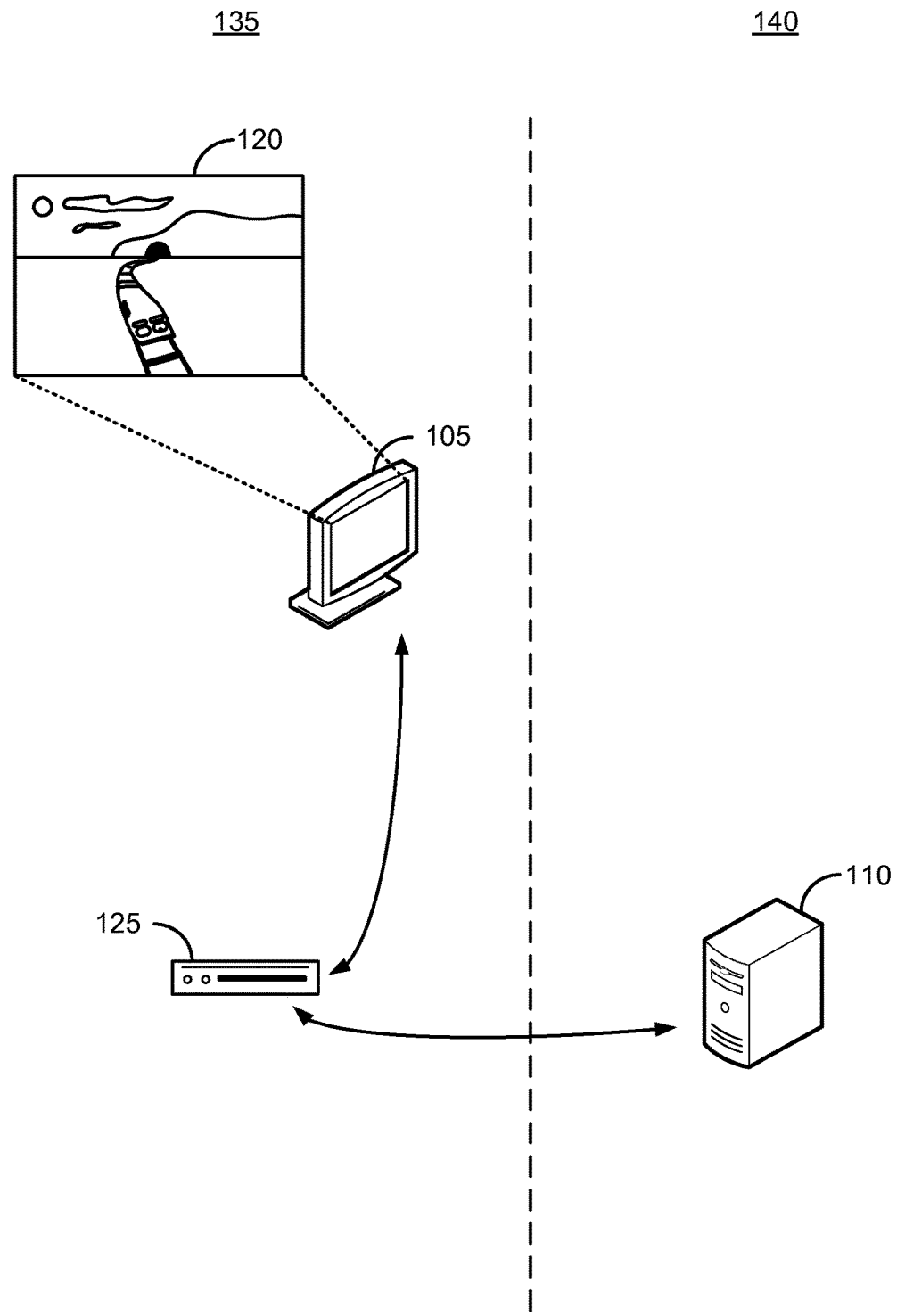
FIG. 4 illustrates another example of a local cache for media content playback.

In some implementations, proxy device 125 can handle the provisioning of fragments between viewer device 105 and media server 110. FIG. 4 illustrates another example of a local cache for media content playback. In FIG. 4, proxy device 125 can determine the bandwidth of the Internet connection and provide the best-quality fragments available to viewer device 105 such that it can avoid rebuffering. For example, proxy device 125 can determine whether the bandwidth of the Internet connection has degraded and then provide fragments to viewer device 105 from local cache 130. When the bandwidth of the Internet connection has increased, proxy device 125 can request higher-quality fragments from media server 110 and then provide those fragments to viewer device 105. In some implementations, proxy device 125 can indicate to viewer device where to send the requests for fragments, but let it directly request and receive the fragments from the devices it sends the requests to without going through proxy device 125.

As previously discussed, proxy server 125 can also anticipate likely media content that the viewer might want to watch next and store that media content at a low quality bit rate in local cache 130. In some implementations, proxy server 125 can determine when to cache media content in local cache 130 based on a usage of local network 135. For example, if the utilization of local network 135 is low between midnight and 6:00 AM, then proxy server 125 might hold off on requesting media content at the low quality bit rate to store in local cache 130 until that time frame. As a result, a library of media content can be stored within local cache 130 that can be streamed from.

In some implementations, manifest files can be modified so that viewer device 105 can request fragments from local cache 130. FIG. 5 illustrates an example of modifying a manifest to provide a local cache for media content playback. In FIG. 5, manifest file 505a can be modified as manifest file 505b by providing an indication that fragments can be requested at a certain quality level from the local cache rather than media server 110. As previously discussed, manifest files can provide metadata regarding fragments at different bit rates. In FIG. 5, manifest file 505a shows metadata indicating the location and time frame of the playback of fragments B, C, and I for both 1080p and SD 576i quality levels. In manifest file 505a, the fragments are indicated as being stored at a CDN (e.g., media server 110 of CDN 140). By contrast, in manifest file 505b, the location of the fragments of the SD 576i quality level are indicated as being stored in the local cache rather than the CDN. In other implementations, manifest file 505a can be modified in other ways to provide an indication to viewer devices that fragments can be requested from a local cache. For example, rather than modifying the locations of the fragments, manifest file 505a can have a tag or other type of data indicating that the media content is also stored in the local cache. Manifest file 505a can be modified by media server 110 or proxy device 125. For example, media server 110 might keep track of which media content are stored in local cache 130, and therefore, modify manifest file 505a when requested by viewer device 105. As another example, proxy device 125 can receive manifest file 505a when viewer device 105 makes a request for media content, determine whether the media content is already cached at a low quality level (or will be cached soon) in local cache 130, and then modify manifest file 505a before providing it to viewer device 105 if it is determined that the media content is already cached (or will be cached soon).

As previously discussed, several viewer devices might be on local network 135 and use proxy device 125 for local cache 130 in FIG. 1. Different viewer devices might have a variety of different capabilities, offering a broad range of devices on local network 135. In some implementations, proxy device 125 can provide multiple different quality levels or bit rates of media content within local cache 130 for the different devices on local network 135. As a result, a viewer device capable of displaying higher-quality media content can be provided a low quality version of the media content that can still be higher quality than the media content that would be provided to a viewer device incapable of the higher-quality media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
   receiving, by a computing device on a local network, an indication that a viewer device on the local network has requested first media content from a media server on a content delivery network (CDN) as a first request to stream first fragments of the first media content, the CDN being remote from the local network, wherein the first fragments are requested by the viewer device and received at the viewer device without having the computing device communicate with the media server;
   requesting, by the computing device during a time interval where the first fragments are being received at the viewer device, second fragments of the first media content from the media server, the second fragments corresponding to a lower quality level than a quality level of the first fragments requested by the viewer device from the media server;
   storing, by the computing device, the second fragments corresponding to the lower quality level in a local cache on the local network;
   receiving, by the computing device, a second request from the viewer device, the second request from the viewer device requesting from the computing device the second fragments stored in the local cache, the second request being responsive to a communication connection between the local network and the media server being below a threshold bandwidth, the threshold bandwidth representing a buffer at the viewer device being drained of the first fragments for playback faster than the buffer is receiving the first fragments from the media server, each of the first fragments being independently decodable relative to the second fragments and each of the second fragments being independently decodable relative to the first fragments, wherein the computing device does not transmit the second request to the media server; and providing, by the computing device, the second fragments stored in the local cache to the viewer device.

2. The computer implemented method of claim 1, wherein the first request corresponds to a first time when a communication connection between the local network and the CDN is at a first bandwidth, and the second request corresponds to a second time when the communication connection between the local network and the CDN is at a second bandwidth, the first bandwidth being higher than the second bandwidth.

3. The computer implemented method of claim 2, further comprising:

requesting, by the computing device, fragments of second media content based on the first request, the fragments of the second media content corresponding to a lower quality level than the quality level of the first fragments of the first media content requested by the viewer device from the media server, the second media content being different from the first media content.

4. The computer implemented method of claim 3, wherein a quality level for the first fragments corresponds to a higher bit rate than the lower quality level.

5. A computing device, comprising:

one or more processors and memory configured to:

send a request for first fragments of first media content to a media server;

store the first fragments in a local cache on a local network, the local cache being available to a first device on the local network, the first device also requesting second fragments of the first media content from the media server for playback by the first device, the first fragments representing playback of a portion of the first media content at a lower quality level than a quality level represented by the second fragments of the first media content requested by the first device, wherein the second fragments are requested by the first device and received at the first device without having the computing device communicate with the media server, and further wherein the request for the first fragments is sent by the computing device during a time interval where the second fragments are being received at the first device; and provide the first fragments from the local cache to the first device on the local network in response to a communication connection between the first device on the local network and the media server on a content delivery network (CDN) that is remote from the local network being below a threshold bandwidth, the threshold bandwidth representing a buffer at the first device being drained of the second fragments for playback faster than the first device is receiving the second fragments from the media server, each of the first fragments being independently decodable relative to the second fragments and each of the second fragments being independently decodable relative to the first fragments.

6. The computing device of claim 5, wherein fragments of a second media content are requested and stored in the local cache based on the first device on the local network requesting the second fragments from the media server for the first media content, the fragments of the second media content being at a lower quality level than the quality level of the second fragments of the first media content requested by the first device from the media server, the second media content being different from the first media content.

7. The computing device of claim 5, the one or more processors and memory configured to:

receive a manifest file including metadata indicating fragments of the media content associated at different quality levels; and modify the manifest file indicating that the fragments at the lower quality level are stored in the local cache.

8. The computing device of claim 5, the one or more processors and memory configured to:

determine characteristics of the first device on the local network; and determine a quality level of the fragments to be stored in the local cache based on the characteristics of the first device on the local network.

9. The computing device of claim 5, wherein the second fragments providing playback of a portion of the first media content at the lower quality level correspond to a lower bit rate than a bit rate of the first fragments requested by the first device on the local network from the media server.

10. The computing device of claim 5, wherein the first fragments stored in the local cache are at a first quality level, and the first device on the local network requests fragments at quality levels within a quality range having a lowest quality level corresponding to a second quality level, the first quality level associated with a lower bit rate than the second quality level.

11. A computer program product comprising one or more non-transitory computer-readable media having computer instructions stored therein, the computer program instructions being configured such that, when executed by one or more computing devices, the computer program instructions cause the one or more computing devices to:

send a request for first fragments of first media content to a media server;

store the first fragments in a local cache on a local network, the local cache being available to a first device on the local network, the first device also requesting second fragments of the media content from the media server for playback by the first device, the first fragments representing playback of a portion of the first media content at a lower quality level than a quality level represented by the second fragments of the first media content when requested by the first device, wherein the second fragments are requested by the first device and received at the first device without having the computing device communicate with the media server, and further wherein the request for the first fragments is sent by the computing device during a time interval where the second fragments are being received at the first device; and provide the first fragments from the local cache to at least one device on the local network in response to based on a communication connection between the local network and the media server being below a threshold bandwidth, the threshold bandwidth representing a buffer at the first device being drained of the second fragments for playback faster than the first device is receiving the second fragments from the media server, each of the first fragments being independently decodable relative to the second fragments and each of the second fragments being independently decodable relative to the first fragments.

12. The computer program product of claim 11, wherein fragments of a second media content are requested and stored in the local cache based on the first device on the local network requesting the second fragments from the media server for the first media content, the fragments of the second media content being at a lower quality level than the quality level of the second fragments of the first media content requested by the first device from the media server, the second media content being different from the first media content.

13. The computer program product of claim 11, wherein the computer program instructions further cause the one or more computing devices to:
receive a manifest file including metadata indicating fragments of the first media content associated at different quality levels; and
modify the manifest file indicating that the fragments at the lower quality level are stored in the local cache.

14. The computer program product of claim 11, wherein the computer program instructions further cause the one or more computing devices to:
determine characteristics of the first device on the local network; and
determine a quality level of the fragments to be stored in the local cache based on the characteristics of the first device on the local network.

15. The computer program product of claim 11, wherein the second fragments providing playback of a portion of the first media content at the lower quality level correspond to a lower bit rate than a bit rate of the first fragments requested by the first device on the local network from the media server.

16. The computer program product of claim 11, wherein the first fragments stored in the local cache are at a first quality level, and the first device on the local network requests fragments at quality levels within a quality range having a lowest quality level corresponding to a second quality level, the first quality level associated with a lower bit rate than the second quality level.

* * * * *